May 9, 1950     O. O. WINTERTON     2,506,849
VEHICLE END GATE
Filed Nov. 5, 1947     2 Sheets-Sheet 1
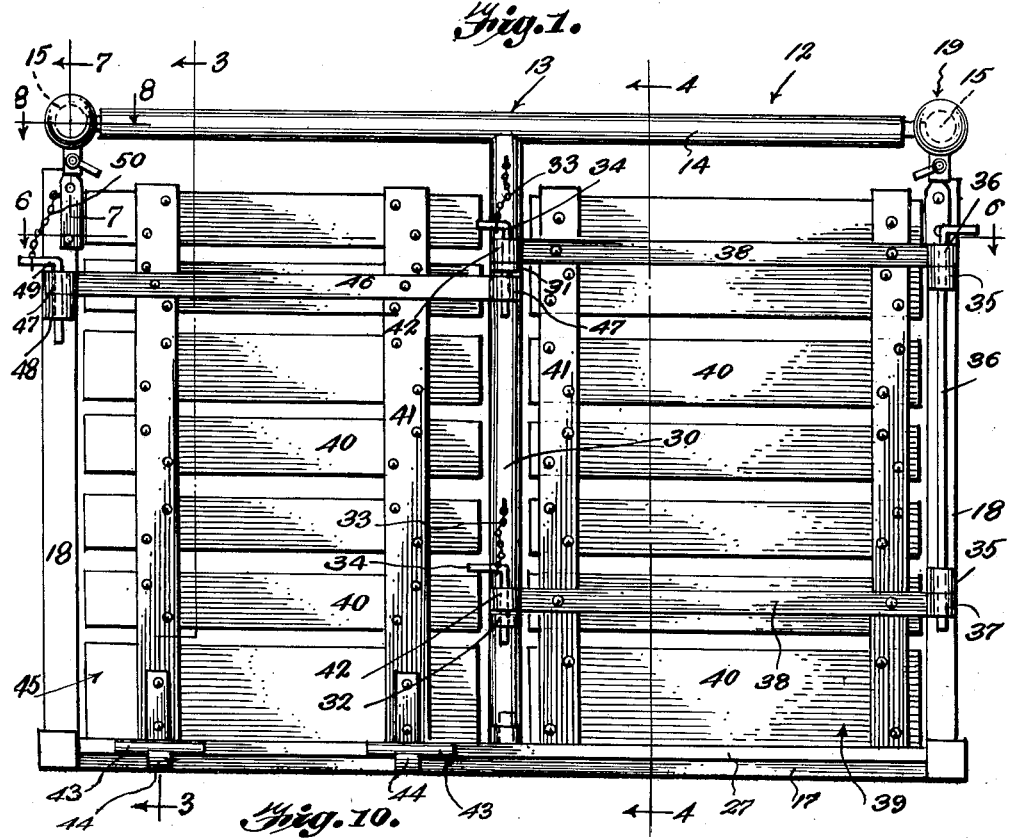
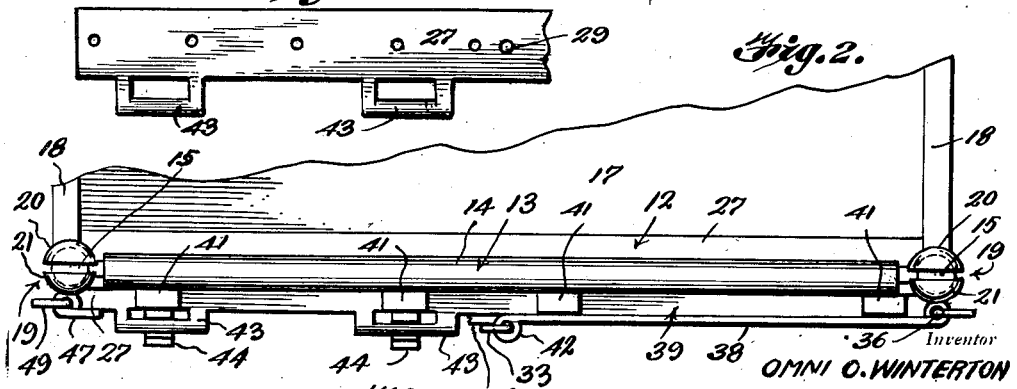
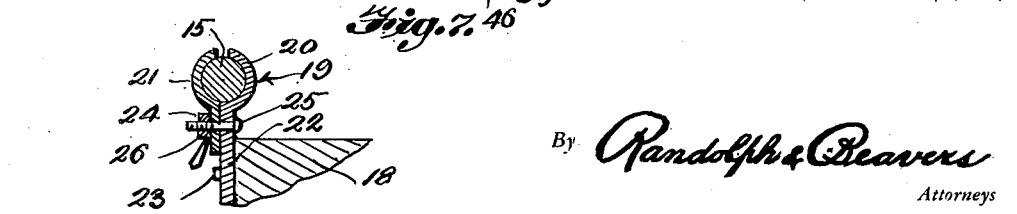
Inventor
OMNI O. WINTERTON
By Randolph & Beavers
Attorneys

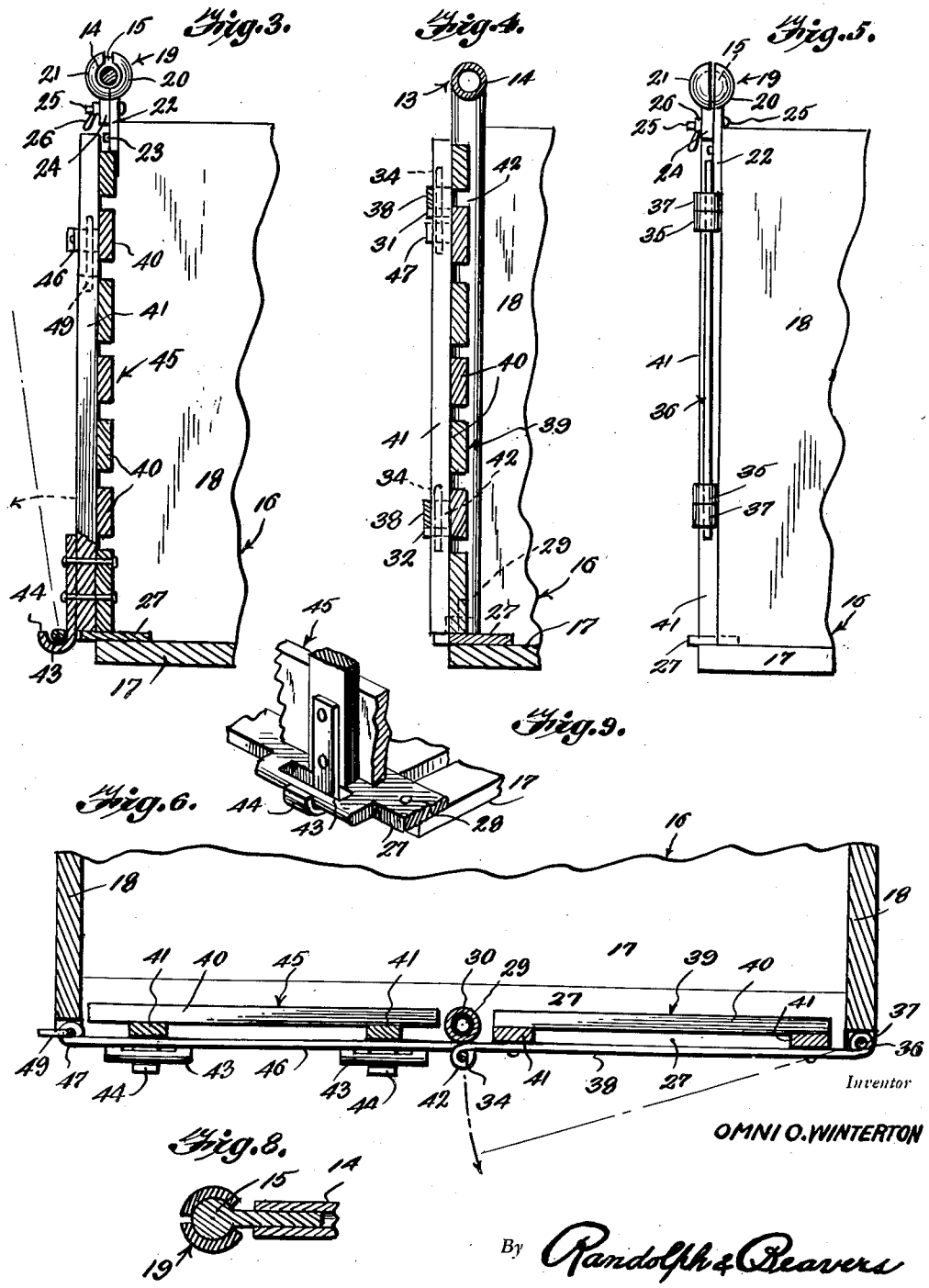

Patented May 9, 1950

2,506,849

UNITED STATES PATENT OFFICE 2,506,849

VEHICLE END GATE

Omni O. Winterton, Roosevelt, Utah

Application November 5, 1947, Serial No. 784,145

5 Claims. (Cl. 296—51)

This invention relates to an improved end gate for trucks and other vehicles and more particularly to a multiple gate capable of being readily demounted from an end of a truck body and which is provided with separate gate sections capable of being independently swung to open position.

More particularly, it is an object of the present invention to provide a multiple end gate including independently movable end gate sections certain of which are swingably disposed on a vertical axis and another of which is swingable on a horizontal axis with respect to the truck body to thereby afford a gate structure which is especially useful to farmers or truckers hauling loads of various characters, certain of which loads may be more conveniently loaded or unloaded through a vertically swinging gate section or closure while other of such loads may be more conveniently loaded or unloaded through a horizontally swinging gate section or closure.

Still a further object of the invention is to provide a novel construction of end gate which is of relatively simple construction, capable of being economically manufactured and sold and which may be quickly and easily removed in its entirety from the rear end of a truck body to facilitate the loading or unloading of animals or for other purposes where the entire width of the rear end of the body is required.

Still another object of the invention is to provide an end gate which will effectively function to prevent spreading of the sides of the truck body and which will thereby function to reinforce said sides and maintain them in upright, substantially parallel position.

Various other objects and advantages of the invention will hereinafter become more fully apparent from the following description of the drawings, illustrating a presently preferred embodiment thereof, and wherein:

Figure 1 is an elevational view looking toward the outer side of the end gate and showing it in an applied and closed position;

Figure 2 is a top plan view thereof;

Figures 3 and 4 are vertical sectional views of the end gate taken substantially along planes as indicated by the lines 3—3 and 4—4, respectively, of Figure 1;

Figure 5 is a side elevational view looking toward the right-hand end of the end gate, as seen in Figure 1;

Figure 6 is a horizontal sectional view thereof taken substantially along a plane as indicated by the line 6—6 of Figure 1;

Figure 7 is a vertical sectional view taken substantially along a plane as indicated by the line 7—7 of Figure 1 on an enlarged scale;

Figure 8 is an enlarged horizontal sectional view taken substantially along a plane as indicated by the line 8—8 of Figure 1;

Figure 9 is a fragmentary perspective view of a portion of the end gate, and

Figure 10 is a plan view of a part thereof.

Referring more particularly to the drawings, the novel end gate for trucks and other vehicles, comprising the invention, is designated generally 12 and includes a substantially T-shaped frame member, designated generally 13 which is preferably of tubular construction and the upper cross member 14 of which is provided at each end thereof with a ball or spherical extension 15.

The end gate frame member 13 is adapted to be mounted at the rear end of a truck or other vehicle body, designated generally 16 and which includes a floor or bottom 17 and upstanding side walls 18. The side walls 18 are provided at their rear ends with upwardly projecting socket members, designated generally 19 each of which is formed of sections 20 and 21, as best illustrated in Figure 7. Each of the sections 20 and 21 includes a substantially semicircular socket portion and the section 20 is provided with an elongated depending shank 22 which is secured by fastenings 23 to the upper portion of the rear end of its associated side wall 18 and which extends thereabove. The socket section 21 is provided with a shorter depending shank portion 24 and said shank portions, above the level of the upper edge of the side wall 18 are provided with aligned openings for receiving a bolt 25 which extends therethrough and which is engaged by a nut 26 having a handle or lever extension and by means of which the clamp sections 20 and 21 may be readily tightened for clamping on of the balls or spheres 15 therein and without the use of a tool. It will thus be readily apparent that the cross member 14 of the T-shaped end gate frame 13 may be quickly and easily applied to or removed from the rear end of a truck or vehicle body 16 and as the spherical members 15 thereof are fixedly secured with respect to the cross member 14, said member will effectively function, in combination with the sockets 19, to maintain the sides 18 in upright, substantially parallel relationship or in their normal positions with respect to one another.

An elongated plate or bar 27 extends across the upper side of the rear end of the body floor or platform 17 and is secured thereto by fastenings 28 and has its rear end partially overlying the rear edge of said floor 17, for a purpose which will hereinafter become apparent. The plate or bar 27 is provided intermediate of its ends with an upstanding stud 29 for receiving the lower end 30 of the depending tubular portion of the frame 13 and which combines with the sockets 19 for detachably securing said frame 13 to the rear end of the body 16.

The frame member 30 is provided with longitudinally spaced, outwardly or rearwardly projecting eyes 31 and 32 above each of which is anchored a chain 33. The chains 33 are anchored to the frame member 30 and are each connected to a pin 34 having an angularly disposed upper end or handle and which pins are insertable through the eyes 31 and 32. The right hand truck side 18, looking from rear to front of the body 16 is provided with rearwardly projecting longitudinally spaced hinge barrel portions 35 for receiving an elongated hinge pin 36 which also extends through similar barrel portions 37 formed on corresponding ends of rigid strap members or bars 38 which normally extend inwardly therefrom transversely across a gate or closure, designated generally 39, to which said strap members 38 are rigidly secured. The gate or closure may be of any desired construction including spaced cross slats 40 and upright members 41 connected to each of said slats 40. The opposite ends of the straps 38 are provided with similar barrel portions 42 adapted to be disposed over the eye members 31 and 32 and releasably connected thereto by the pins 34 for retaining the closure 39 in a closed position, and it will be readily apparent that by removal of the pins 34 the closure 39 may be swung horizontally outward to an open position on the hinge pin 36. It will also be noted that the barrel portions 37 of the straps 38 are disposed against the remote end of the hinge barrels 35 so as to prevent the gate 39 from sliding upwardly or downwardly on the hinge pin 36 when it is in position thereby preventing an animal from disengaging the gate by placing its horns through the space between the slats 40 and lifting upwardly thereon.

As best seen in Figures 1, 2 and 10, the bar 27 is provided with longitudinally spaced rearwardly projecting elongated loop portions 43 which are disposed adjacent the side of the truck body 18, remote to the gate 39 and which are engaged by hook portions 44 which depend from and are secured to a second gate or closure, designated generally 45 and which is preferably constructed similarly to the closure 39 including the spaced slats 40 and the vertical connecting members 41. It will be readily apparent that the gate 45 is mounted to swing vertically or on a horizontal axis outwardly and downwardly from a closed to an open position. The gate or closure 45 is provided with a transversely extending strap member or bar 46 having barrel portions 47 at the ends thereof, one of which barrel portions is disposed beneath the eye 31, when the closure 45 is in a closed position, to be engaged by the upper latch pin 34 and the other of which barrel portions 47 is adapted to be disposed beneath a latch or keeper eye 48 which projects from the rear end of the other truck side 18 and said last mentioned barrel portion 47 and the keeper eye 48 are adapted to receive a latch pin 49 which is anchored thereabove by a chain 50 to said side 18. Accordingly, it will be readily obvious that by removing the upper latch pin 34 and the latch pins 49 the gate or closure 45 can be swung outwardly and downwardly to an open position while the gate 39 will be held in a closed position by the other latch pin 34 and, if desired, the upper latch pin 34 can be withdrawn only sufficiently to disengage the barrel portion 47 for releasing the gate 45. Similarly, when the latch pins 34 are removed for releasing the gate 39 the latch pin 49 will still function to maintain the gate 45 in a closed position.

It will be readily apparent that by providing two or more depending frame elements 30 which would be disposed in spaced relationship, that three or more gates or closures could be provided in the end gate 12 to thus afford two or more vertically or horizontally swinging closures, as desired.

From the foregoing it will be readily apparent that the end gate 12 will afford a very rigid and durable structure for the rear end of a truck body which will effectively maintain the sides thereof in properly spaced relationship, yet which is extremely versatile and easily removable and which is especially valuable to farmers and other truckers of diversified loads. The gate or closure 45 may be lowered to provide a loading or unloading ramp and the gate 39 may be swung to an open position into a loading chute or when loading from a platform, or by removing the pins 36 and 49 and loosening the socket members 19 the entire end gate structure can be removed from the rear end of the truck body 16 as a unit for loading or unloading live stock, large machinery and other structures too large to pass through the openings of the frame 13. In removing the entire end gate as a unit, after the pins 36 and 49 have been removed, the frame member 13 is disengaged from the sockets 19 so that it may be raised sufficiently to disengage its portion 30 from the stud 29. Since the gate 39 is free to swing on pins 34 sufficiently to clear barrel portions 35 and as the upper pin 34 allows the frame 13 to be lifted relatively to gate 45 without being disengaged therefrom, the entire unit is then capable of being swung outwardly and downwardly on the loops 43 and hooks 44 until the hooks can be raised and disengaged from the loops 43.

Various modifications and changes are contemplated and may obviously be resorted to, without departing from the spirit or scope of the invention as hereinafter defined by the appended claims.

I claim as my invention:

1. An end gate for truck bodies comprising a T-shaped frame adapted to be demountably attached for ready removal to the rear ends of the sides and floor of a truck body and combining therewith to afford a plurality of gate openings, a gate for closing each of said gate openings, each of the gates being hingedly connected to the truck body, latch means for normally retaining said gates in closed positions, said latch means including a plurality of eyes carried by each of the gates, a plurality of eyes carried by the upright of the frame, a set of pins engaging the frame eyes and each of the eyes of one gate and one eye only of a second gate for latching the two gates in a closed position, an eye carried by the truck body, and a second pin engaging the other eye of the second gate and the truck body eye for latching the second gate in a closed position whereby through disengagement of certain of the pins a selected gate only may be released for swinging movement to an open position, at least one of said gates being mounted to swing outwardly to an open position on a vertical axis, and at least one other of said gates being mounted to swing outwardly to an open position on a horizontal axis.

2. An end gate structure as in claim 1, said last mentioned gate being hingedly mounted at its bottom edge to the truck body floor for swinging movement outwardly and downwardly to an open position.

3. An end gate structure as in claim 1, said end gate frame including a transversely extending cross bar defining the top thereof and having end portions detachably anchored to the upper ends of the truck sides and forming a brace for retaining said truck sides in properly spaced relationship, said frame also including at least one depending member having an open lower end, and a stud or pin extending upwardly from the platform into said lower open end of the depending frame portion.

4. An end gate as in claim 1, said end gate frame including an upper transverse cross bar having fixed spherical extensions at the ends thereof, and clamp members secured to and rising from the rear ends of the truck sides and each formed of sections combining to form a socket, each of said sockets being detachably secured to one of said spherical extensions for detachably connecting the end gate frame to the truck body.

5. An end gate as in claim 1, said end gate frame including an upper transverse cross bar having fixed spherical extensions at the ends thereof, clamp members secured to and rising from the rear ends of the truck sides and each formed of sections combining to form a socket, each of said sockets being detachably secured to one of said spherical extensions for detachably connecting the end gate frame to the truck body, said frame having at least one depending member extending downwardly to adjacent the truck floor and having an open lower end, and an upstanding pin fixedly disposed relatively to the truck floor for engaging the open lower end of said depending frame element and combining with said socket members for detachably and fixedly positioning the end gate frame relatively to the truck body.

OMNI O. WINTERTON.

REFERENCES CITED

The following references are of record in the file of this patent:

UNITED STATES PATENTS

| Number | Name | Date |
| --- | --- | --- |
| 1,563,244 | Weeth | Nov. 24, 1925 |
| 1,589,507 | Bond | June 22, 1926 |
| 1,863,524 | Hewitt | June 14, 1932 |
| 1,884,334 | Standish | Oct. 25, 1932 |